United States Patent [19]
Daoud

[11] Patent Number: 6,157,715
[45] Date of Patent: Dec. 5, 2000

[54] MODULAR LAYERED NETWORK INTERFACE UNIT

[75] Inventor: Bassel Hage Daoud, Parsippany, N.J.

[73] Assignee: Lucent Technologies, Inc., Murray Hill, N.J.

[21] Appl. No.: 09/143,313

[22] Filed: Aug. 28, 1998

[51] Int. Cl.[7] ........................................ B65D 6/00

[52] U.S. Cl. .......................... 379/412; 379/399; 220/4.02

[58] Field of Search ...................................... 379/399, 412, 379/325, 413, 387, 327, 328, 330, 331, 332; 220/4.02

[56] References Cited

U.S. PATENT DOCUMENTS

| | | | |
|---|---|---|---|
| 5,363,440 | 11/1994 | Daoud | 379/399 |
| 5,550,916 | 8/1996 | Daoud | 379/399 |
| 5,803,292 | 9/1998 | Daoud | 220/4.02 |
| 6,025,557 | 2/2000 | Daoud | 174/65 G |

Primary Examiner—David R. Hudspeth
Assistant Examiner—Susan Wieland
Attorney, Agent, or Firm—Howard C. Miskin; Gloria Tsui Yip

[57] ABSTRACT

A network interface unit having a plurality of modular layers mountable on each other in a consecutive manner with each modular layer having provisions for being hinged.

15 Claims, 5 Drawing Sheets

MODULAR LAYERED NETWORK INTERFACE UNIT

CROSS REFERENCE TO RELATED APPLICATION

This application is related to U.S. patent application having Ser. No. 09/143,315 and also identified by Docket Number Daoud 118, and is assigned to the same assignee as the present invention.

BACKGROUND OF THE INVENTION

This invention relates to telecommunications apparatus and, in particular, to network interface units and building entrance protector units.

Network interface units are known in the art and one such unit is disclosed in U.S. Pat. No. 5,363,440 ('440) of Daoud, and which is herein incorporated by reference. As discussed in the '440 patent, network interface units constitute the demarcation between the customer's equipment and the telephone network. In buildings including multiple subscribers, the network interface unit is typically mounted in a basement and includes an array of customer bridges, each bridge being coupled to an individual subscriber line. The bridges are typically coupled to the phone network through an RJ11 jack and plug (known in the art) so that the customer can plug a working phone into the jack to determine if any problems lie in the customer or network side of the telecommunications system.

Network interface units typically also include a building entrance protector portion which comprises a cable splice chamber and a protector field device for providing surge protection for each customer. Depending on the size or type of the components; e.g., fiber optics, wireless telephone, or coaxial equipment, to be mounted in a network interface unit to accommodate the needs of the customers in the building, the dimensions of the network interface unit may need to be adjusted, requiring various sized housings for different types of components, leading to different sized network interface units. This may be very costly, especially if the network interface unit is made of plastic. More particularly, a change to a plastic part, one network interface unit for each different type of components commonly requires expensive new tooling. It is desirable to design a network interface unit that can be easily adapted to its various dimensions so as to accommodate the needs of customers of a building or those of the telecommunications systems.

SUMMARY OF THE INVENTION

The invention in one aspect is a network interface unit for servicing a multiplicity of subscribers.

The network interface unit has a base portion and a cover portion and, in one embodiment, comprises a bottom portion mounted on the base portion and including a splice chamber and an array of protector devices mounted thereon. The splice chamber includes wiring for connecting a cable to said protectors. The network interface unit further comprises a plurality of modular layers, a plurality of stacked trays and a plurality of hinges, and with the plurality of layers and trays each having first and last members thereof. Each modular layer includes at least an array of customer bridges each adapted for coupling to a different line of a subscriber and each array having cabled wiring to electrically connect to respective protective devices mounted in the bottom portion. The plurality of stacked trays each having first and second sides and each tray holds a respective modular layer. Each tray has at least one opening at its first side for allowing passage of respective cabled wiring. The plurality of hinges has first and second ends for interconnecting the plurality of trays and with each hinge having one of its ends attached to the side of the tray having the opening. The plurality of hinges has first and last hinges with the first hinge being joined between the first tray and the base portion and the last hinge being joined between the last tray and the cover.

BRIEF DESCRIPTION OF THE DRAWINGS

These and other features of the invention are delineated in detail in the following description. In the drawings.

It will be appreciated that, for purposes of illustration, these figures are not necessarily drawn to scale.

DETAILED DESCRIPTION OF THE PREFERRED EMBODIMENTS

Figure 1:
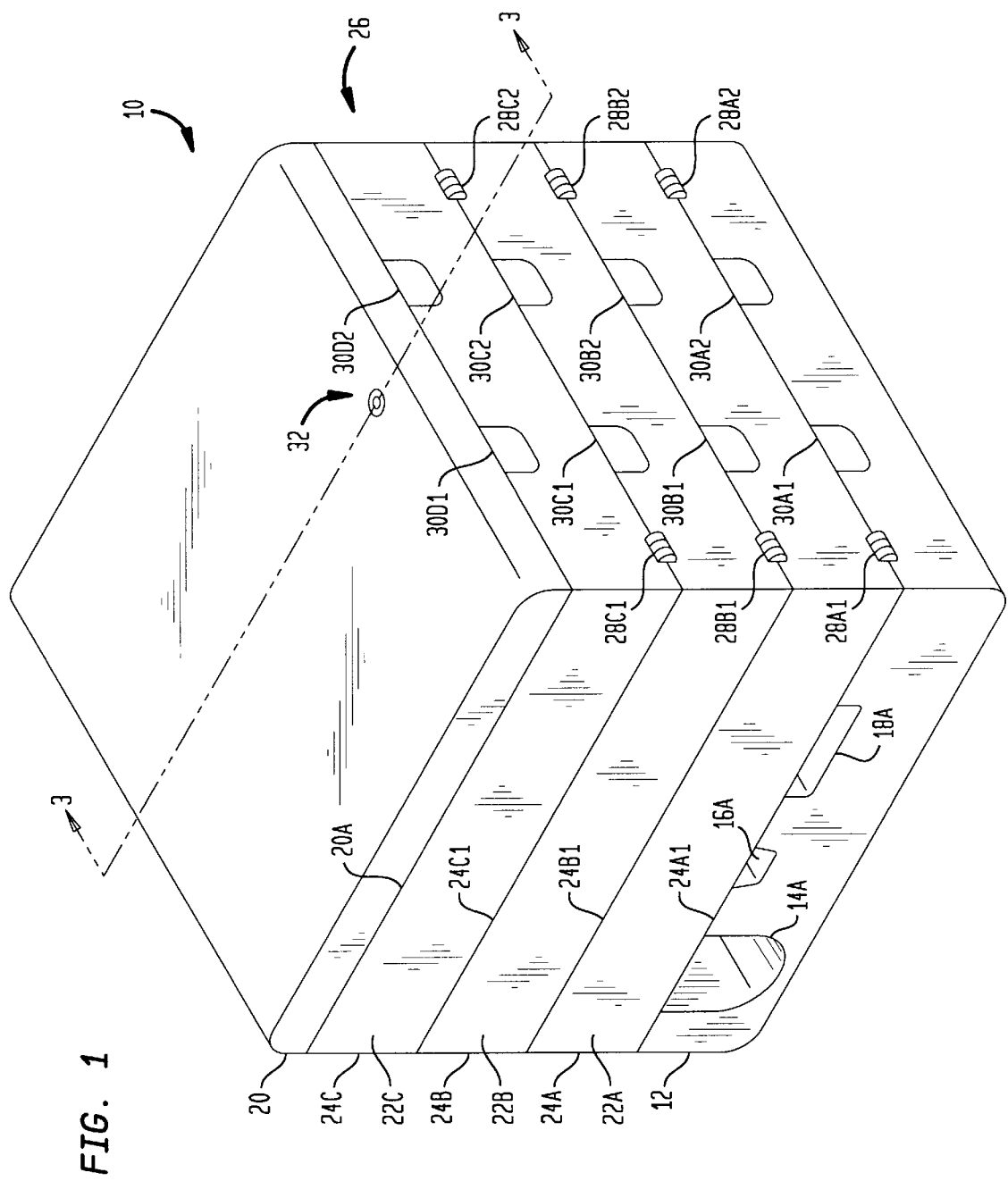
FIG. 1 is a front perspective view of a network interface unit in accordance with an embodiment of the invention illustrated to show the first or hinged side of the network interface unit.

FIG. 1 illustrates primarily the network interface unit 10 in accordance with the invention. The network interface unit 10 embodies a building-block technique and is comprised of modular layers and sets of hinges. The modular layers are preferably mounted in respective trays having openings through which cabling from the modular layers pass. The modular layers allow for the mounting of panels or electrical devices thereon, and the panels allow for mounting of other components, such as telephone and fiber optic equipment. One of the opposite sides of the network interface unit preferably includes a security mechanism, such as screws and screw receptacles, so that the modular layers can be opened separately or together as a set.

The network interface unit 10 of FIG. 1, has a base portion 12 having openings 14A, 16A and 18A all providing passageways for the entrance and/or exit of cabling. The network interface unit 10 further has a cover portion 20 having a lower edge portion 20A.

The network interface unit 10 further comprises a plurality of modular layers 22A, 22B, and 22C, each of which is respectively mounted in trays 24A, 24B, 24C, which have lower edge portions 24A1, 24B1 and 24C1 respectively. The modular layers 22A, 22B and 22C preferably respectively cooperate with trays 24A, 24B and 24C, but if desired, one or more layers 22A, 22B and 22C may be arranged to cooperate with tray 24A, tray 24B or tray 24C or any combination thereof. The modular layers 22A, 22B and 22C may be of any number and are preferably stacked upon each other in a consecutive manner. Similarly, the trays 24A, 24B, and 24C, may be of any number. The plurality of modular layers 22A . . . 22C has a first and last modular layer, such as 22A and 22C respectively. Similarly, the plurality of stacked trays 24A . . . 24C has a first and a last tray, such as 24A and 24C respectively. The modular layers 22A . . . 22C and trays 24A . . . 24C may be arranged using a building-block technique so as to provide a network interface unit 10 that has various dimensions to accommodate the various needs of customers and telecommunication systems, discussed in the "Background" section, but need only provide one design for one modular layer and its associated tray.

The network interface unit 10 is illustrated in FIG. 1 so as to expose the hinge side 26 of the network interface unit 10. As used herein, the hinge side 26 of the network interface device 10, and the hinge side of modular layers 22A . . . 22C, the trays 24A . . . 24C, and the cover 20 may be interchangeably referred to as the first side. The network interface unit 10 has a plurality of hinges 28A1–28A2, 28B1–28B2, 28C1–28C2 that respectively operatively cooperate with trays 24A, 24B, and 24C in a manner to be more fully described hereinafter with reference to FIG. 5.

The network interface unit 10 further comprises a plurality of openings or windows 30A1–30A2, 30B1–30B2, 30C1–30C2 that are used to more advantageously dress the cabling associated with modular layers 22A, 22B, and 22C. The windows 30A1 . . . 30C2, as well as other windows of the network interface unit 10, also provide the means for ingress or egress of cabling associated with the network interface unit 10. The network interface unit 10 further comprises openings or windows 30D1–30D2 that may be used to dress the cabling associated with the last or upper modular layer 22C. The cover 20 further includes a screw and screw receptacle arrangement 32 dimensioned for complementary mating therebetween and that may be used to connect/disconnect the cover 20 to the last tray 24C. The network interface unit 10 further comprises a locking side 34 which is more clearly illustrated in FIG. 2.

Figure 2:
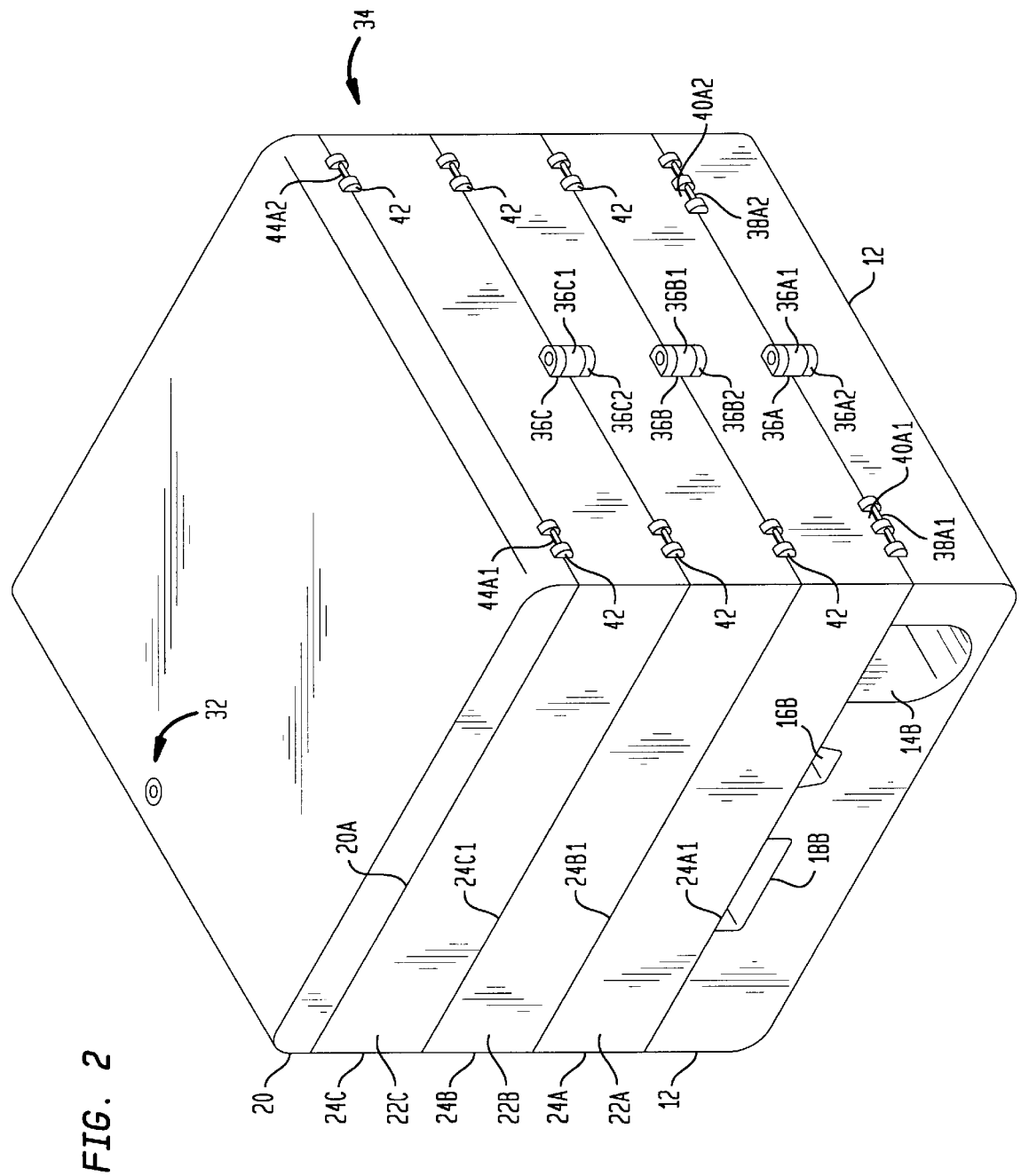
FIG. 2 is a rear perspective view and illustrated to show the second or locking side of the network interface unit.

As used herein, the locking side 34 of the network interface device 10, and the locking side of the modular layers 22A . . . 22C, the trays 24A . . . 24C, and the cover 20 may be interchangeably referred to herein as the second side. The network interface unit 10 further comprises a plurality of sets of screws and screw receptacles 36A, 36B, and 36C respectively serving as locking arrangements, and comprised of upper and lower portions 36A1–36A2, 36B1–36B2, and 36C1–36C2. The upper and lower portions 36A1 . . . 36C2 are dimensioned for complementary mating therebetween. As seen in FIG. 2, the set 36A is attached between the base 12 and the first tray 22A. The set 36B is attached between the first tray 24A and the second tray 24B. The third set 36C is attached between the next to the last tray 24B and the last tray 24C.

The base 12 further comprises hinged arrangements 38A1 and 38A2 into which respectively extend lips 40A1 and 40A2 which are extensions of a splice chamber to be further described with reference to FIG. 4. Further, the network interface unit 10 comprises a plurality of hinges 42 which is interconnected to trays 24A, 24B, and 24C, but with only the hinges 42 of tray 24C being actively used and having lip portions 44A1 and 44A2 of the cover 20 extending therein so that the cover 20 may be hingedly rotated about the last tray 24C. The mating of lip portions 44A1 and 44A2 to the hinges 42 of tray 24C, as well as the mating of lips 40A1 and 40A2 to hinges 38A1 and 38A2 respectively, may be accomplished in a manner known in the art so as to provide proper hinging therebetween. The internal components making up the network interface unit 10 may be further described with reference to FIG. 3 which is a view taken along line 3—3 of FIG. 1.

Figure 3:
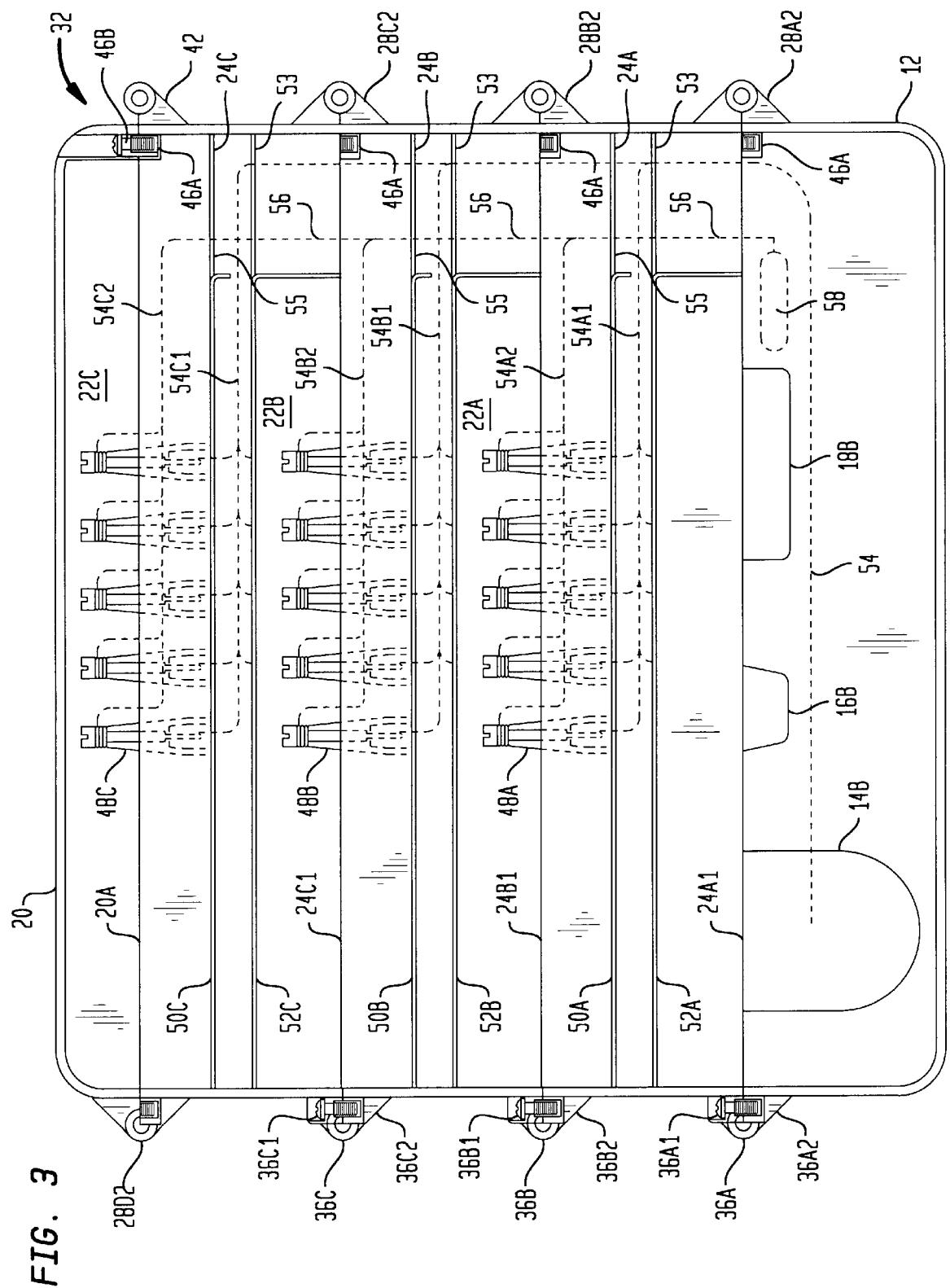
FIG. 3 is a view of the network interface unit taken along line 3—3 of FIG. 1.

FIG. 3 illustrates a screw receptacle 46A and a screw 46B, both part of the screw arrangement 32 of cover 20, and both of which are dimensioned for complementary mating therebetween and with screw receptacle being located in the tray 24C and with screw 46B attached to cover 20. Further, FIG. 3 illustrates the first tray 24A, the second tray 24B, and the base 12, each having an unused receptacle 46A.

The modular layers 22A, 22B, and 22C, respectively are shown as being lodged in trays 24A, 24B and 24C, and include customer bridges 48A, 48B and 48C, which are more fully described in the previously mentioned U.S. Pat. No. 5,363,440.

The modular layers 22A, 22B, and 22C further include electrical devices 50A–52A, 50B–52B and 50C–52C respectively. These electrical devices 50A–52A, 50B–52B, 50C–52C are preferably panels that allow for the mounting of electronic components, such as those components found in telephone and fiber optic equipment. More particularly, the panels 50A . . . 52C may serve as motherboards for the mounting of the data-processing devices.

FIG. 3 further shows cabled wiring for the network interface device 10 comprising cable runs 54 and 56 that pass through openings 53 and 55 respectively in the trays 24A, 24B and 24C. The openings 53 and 55 are on the first or hinge side of the trays 24A, 24B and 24C. The cable run 54 represents the wiring to and from the network interface unit 10 and is segmented into cable runs 54A1, 54B1, and 54C1 that respectively supply the cabling to and from devices 48A–50A–52A; 48B–50B–52B; and 48C–50C and 52C. The cable run 56 is comprised of the cabling 54A2, 54B2 and 54C2 that respectively comprise the wiring from the customer bridges 48A, 48B and 48C that are all interconnected to connector 58 which interconnects the customer bridges 48A, 48B and 48C to a protective unit 60 which may be further described with reference to FIG. 4.

Figure 4:
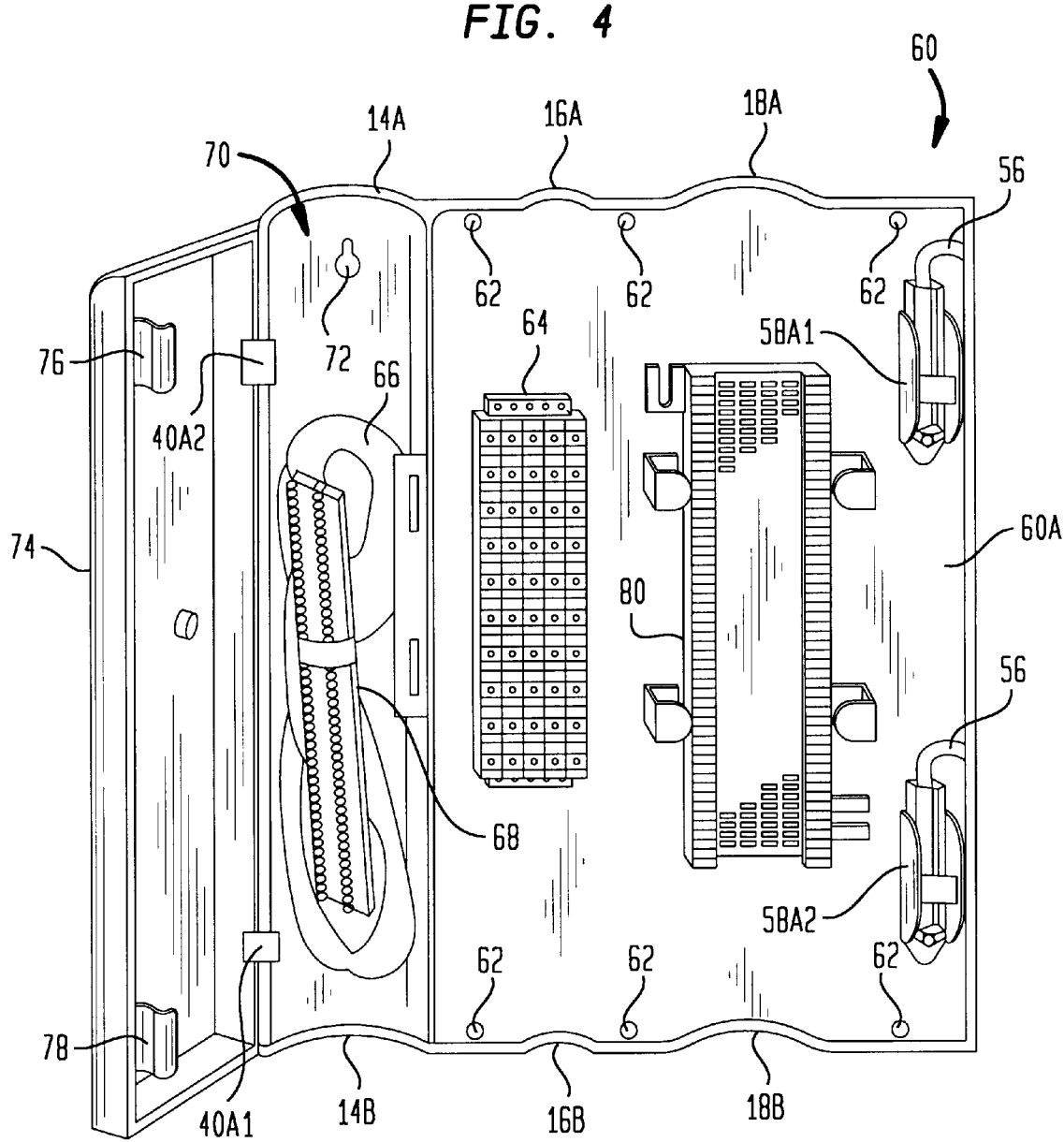
FIG. 4 is a front perspective view of the protector unit in accordance with one embodiment of the present invention.

FIG. 4 illustrates a building entrance protector unit 60 having the cable run 56 interconnected thereto by way of connector 58 which is comprised of separate connectors 58A1 and 58A2 both being conventional types. The protector unit 60 is situated onto base 12 of the network interface unit 10 having the openings 14A, 16A and 18A of FIG. 1 which are respectively arranged, in a complementary manner, relative to openings 14B, 16B and 18B of the network interface unit 10. The protector unit 60 is mounted to a frame member 60A by way of fasteners 62, or other equivalent means. The protector unit 60 includes an array 64 of protective devices with each protector device of array 64 being typically a solid state surge arrester which is plugged into a socket (not shown) mounted to the protective unit 60, in particular, the frame member 60A of the protector unit 60. The array 64 of protectors is electrically coupled to a bundle of wires 66 which terminate in a splice connector 68.

The splice connector 68, known in the art, provides the capabilities for connecting a cable to the protective array 64. The splice connector 68 and the major portion of the wire bundle 66 are situated within a splice chamber 70. The chamber 70 includes the openings 14A and 14B serving as cable passageways, whereas the other openings or cable passageways 16A, 16B, 18A and 18B are located under the protective unit 60. The back wall of the splice chamber 70 includes a hole 72 which permits wall mounting of the network interface unit 10. A cover 74 is mounted by means of clip members 76 and 78 and hinges 40A1 and 40A2 (previously described with reference to FIG. 2) to the splice chamber 70 to protect the splices formed therein.

Also mounted on the protective unit 60 is a cross–connect or tapping field device 80. Such field device 80, which is standard in the art, includes an array of connectors, each coupled between a protector and an associated customer bridge by way of cable run 56.

By applying jumper cables (not shown) to the connectors, connections can be changed between protectors and customer bridges when, for example, a customer changes his or her location in the building.

The overall benefits of the network interface unit 10 of the present invention may be further described with reference to FIG. 5 which illustrates the arrangement of FIG. 3 in its folded–out positions. From FIG. 5 it is seen that the cable runs 54 and 56 passing through openings 53 and 55, respectively, of each of the trays 24A, 24B and 24C, are provided with sufficient slack so that the modular layers 22A, 22B and 22C may be folded out so as to reveal the components thereof and the wiring and wire wraps thereunder. Such fold–out capabilities allow for any maintenance thereon of the components of all of the modular layers 22A . . . 22C.

Figure 5:
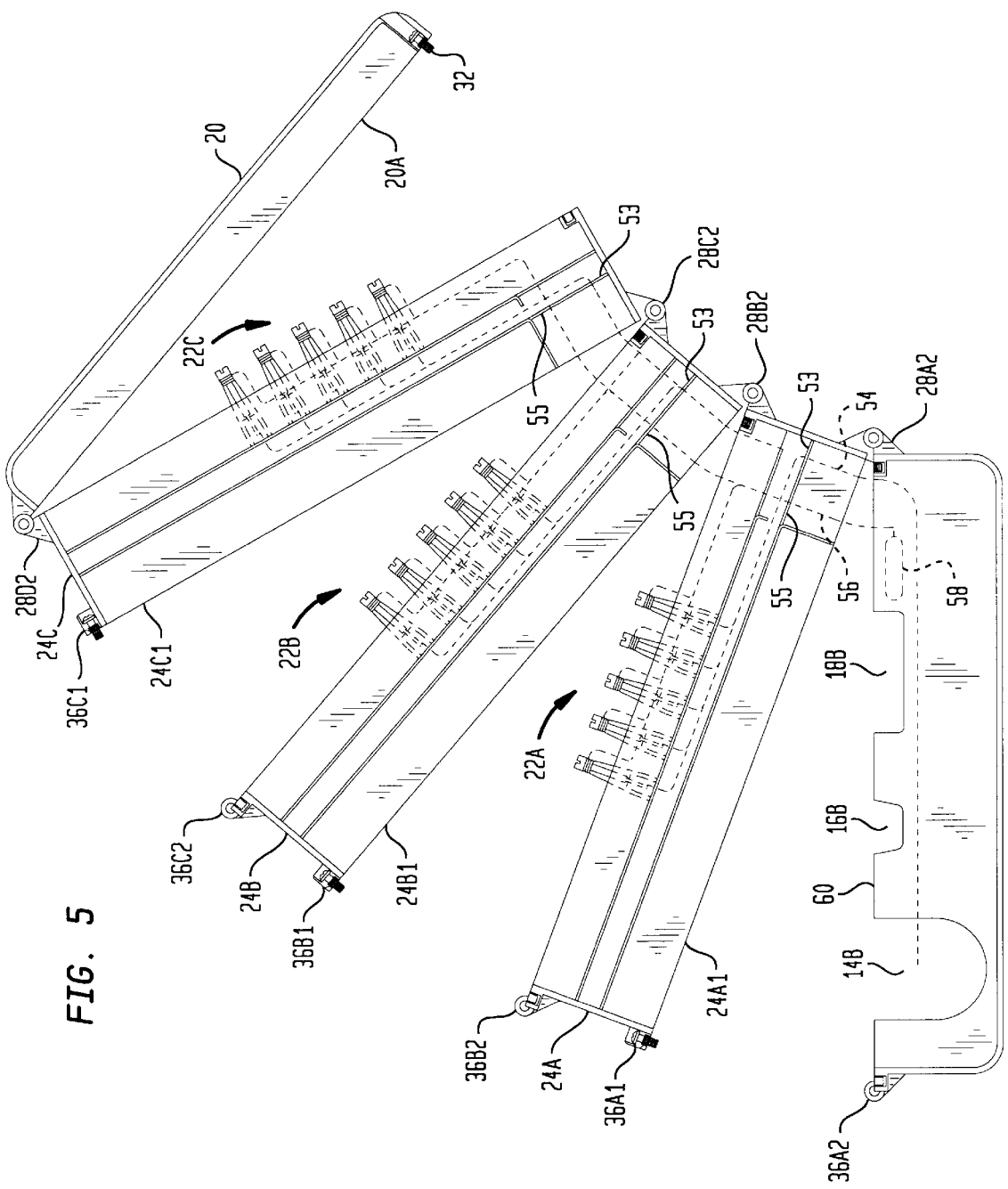
FIG. 5 illustrates the fold-out capabilities and modular layer selection options of the present invention.

From FIG. 5, it is seen that hinges 28A2, 28B2, and 28C2 (as well as hinges 28A1, 28B1 and 28C1 not shown in FIG. 5 but shown in FIG. 1) are located at the same side, that is, side one of the trays 24A, 24B and 24C that provides openings 53 and 54 for ingress and egress so that the cable runs 54 and 56 extend along the hinged or first side of the network interface unit 10. Further, from FIG. 5 it is seen that the hinges, such as hinge 28C2, have motion limits that define the movement and the open positions of the modular layers 22A . . . 22B. These motion limits are defined by the two members attached to their associated tray 24A . . . or 24C.

FIG. 5 illustrates the modular layers 22A, 22B and 22C as being interconnected by the hinges 28A2, 28B2 and 28C2 but allowing the modular layers 22A . . . 22C, by means of trays 24A . . . 24C, to be separately swung out to their open positions. If desired, the modular layers 22A, 22B and 22C may be easily interconnected. For example, if the screw 36A1 is interconnected to the receptacle 36A2, then the first modular layer 22A would rest upon the base 12 yet still allow the second and last modular layers 22B and 22C, respectively, to be individually swung out.

Further, if the screw 36B1 is interconnected to the receptacle 36B2 and also the screw 36A1 is interconnected to its receptacle 36A2, then the modular layers 22A and 22B will be operatively positioned in unison, capable of accommodating equipment having double the height of modular layer 22A, but also allowing for the last modular layer 22C to be operatively positioned separately. Finally, all the layers may be joined together if now the screw 36C1 is further joined to receptacle 36C2, thereby, allowing only the cover 20 to be hinged about its hinge 28D2 but allowing all the modular layers 22A . . . 22C to serve as one operational package to accommodate tray 24A with equipment having a height three times greater than modular layer 22A.

Although the previous description referred separately to modular layers 22A . . . 22C and to trays 24A . . . 24B, if desired these elements may be merged into one unit so long as the function of each modular layer 22A . . . 22C and each tray 24A . . . 24C is provided in accordance with the teaching of the present invention.

It should now be appreciated that the practice of the present invention provides for a network interface unit 10 that employs a building block technique, in particular, employs modular layers that may be consecutively arranged or stacked on one another so that the needed components for the network interface unit may be lodged therein. The modular layer not only allows one network interface unit 10 to be designed, but also allows for the flexibility for each of the network interface units to have selectable multiple modular layers 22A, 22B and 22C so as to accommodate the various needs of the customer and telecommunication systems with one designed network interface unit.

Various additional modifications will become apparent to those skilled in the art. All such variations which basically rely on the teachings to which the invention has advanced the art are properly considered within the scope of this invention.

What I claim is:

1. A network interface unit having a base portion having mounted therein a bottom portion including a splice chamber and an array of protector devices mounted thereon, said splice chamber including wiring for connecting a cable to said protectors, said network unit further having a cover portion and servicing a multiplicity of subscribers and comprising;

a plurality of modular layers having first and last modular layers thereof and each modular layer including at least an array of customer bridges each adapted for coupling to a different line of a subscriber and each array having cabled wiring to electrically couple to respective protective devices mounted in said bottom portion;

a plurality of contiguously stacked trays intermediate of said base portion and said cover portion and having first and last trays thereof and each tray having first and second sides and each tray holding a respective modular layer and having at least one opening at said first side thereof for allowing passage of said respective cabled wiring; and a plurality of hinges including a first and a last hinge, with each hinge having first and second ends for pivotally interconnecting said contiguously stacked trays and with said base and cover portions, each of said sides of said trays having said opening having one end of one of said hinges attached thereto, said first hinge pivotally joining said first tray and said base portion and said last hinge pivotally joining said last tray and said cover portion.

2. The network interface unit according to claim 1, wherein at least one of said plurality of modular layers further comprises at least one electrical device and said cabled wiring further comprises wiring for electrically connecting said at least one electrical device to said array of customer bridges within its respective modular layer.

3. The network interface unit according to claim 2, wherein said cabled wiring for said at least one electrical device further comprises wiring for electrically connecting said at least one electrical device to said array of protective devices.

4. The network interface device according to claim 3, wherein said plurality of hinges have movement limits defined by said first and second ends of said hinges and wherein said plurality of trays have opened positions defined by said movement limits of said hinges.

5. The network interface device according to claim 4, wherein said cabled wiring has sufficient slack to accommodate said opened positions of said plurality of trays.

6. The network interface unit according to claim 1, wherein said plurality of trays has a next to last tray and further comprising:

a plurality of sets of screws and screw receptacles dimensioned for complementary mating therebetween and said plurality having a first and a last set, said first set having its receptacle mounted to said base and its screw mounted to said second side of said first tray and said last set having its screw mounted to said second side of said last tray and its receptacle mounted to said second side of said next to last tray.

7. The network interface unit according to claim 1, wherein said cover has first and second sides and further comprising a cover hinge having first and second ends with the first end of the cover hinge being attached to the second side of said last tray and the second end of the cover hinge being attached to the first side of said cover.

8. The network interface unit according to claim 7 further comprising a cover set of a screw and screw receptacle dimensioned for complementary mating therebetween, said cover receptacle mounted to the second side of said last tray and said cover screw mounted to the second side of said cover.

9. A network interface module for servicing a plurality of subscribers and having a base portion and a cover portion with first and second ends and adapted for mounting over a building entrance protector unit, the interface module comprising:

a plurality of modular layers having first and last modular layers thereof and each modular layer including at least an array of customer bridges each adapted for coupling to a different line of a subscriber and each array having cabled wiring;

a plurality of contiguously stacked trays intermediate of said base portion and said cover portion and having first and last trays thereof, each tray having first and second ends and said last tray being mounted to said base and, each tray holding a respective modular layer, each tray having at least one opening at said first side for allowing passage of said respective cabled wiring; and a plurality of hinges including a first and a last hinge with each hinge having first and second ends for interconnecting said contiguously stacked trays and with said base and cover portions, each of said sides of said trays having said opening having one end of one of said hinges attached thereto, said first hinge pivotally joining said first tray and said base portion and said last hinge pivotally joining said last tray and said cover portion.

10. The network interface unit according to claim 9, wherein at least one of said plurality of modular layers further comprises at least one electrical device and said cabled wiring further comprises wiring for electrically connecting said at least one electrical device to said array of customer bridges within its respective modular layer.

11. The network interface device according to claim 10, wherein said plurality of hinges have movement limits defined by said first and second ends of said hinges and wherein said plurality of trays have opened positions defined by said movement limits of said hinges.

12. The network interface device according to claim 11, wherein said cabled wiring has sufficient slack to accommodate said opened positions of said plurality of trays.

13. The network interface unit according to claim 9, wherein said plurality of trays has a next to last tray and further comprising:

a plurality of sets of screws and screw receptacles dimensioned for complementary mating therebetween and said plurality having a first and a last set, said first set having its receptacle mounted to said base and its screw mounted to said second side of said first tray and said last set having its screw mounted to said second side of said last tray and its receptacle mounted to said second side of said next to last tray.

14. The network interface unit according to claim 9, wherein said cover has first and second sides and further comprising a cover hinge having first and second ends with the first end of the cover hinge being attached to the second side of said last tray and the second end of the cover hinge being attached to the first side of said cover.

15. The network interface unit according to claim 14 further comprising a cover set of a screw and screw receptacle dimensioned for complementary mating therebetween, said cover receptacle mounted to the second side of said last tray and said cover screw mounted to the second side of said cover.

* * * * *